(12) United States Patent
Zhang et al.

(10) Patent No.: US 12,074,510 B2
(45) Date of Patent: Aug. 27, 2024

(54) SWITCHING POWER CONVERTER FREQUENCY OPTIMIZATION TECHNIQUES

(71) Applicant: Analog Devices International Unlimited Company, Limerick (IE)

(72) Inventors: Jindong Zhang, Fremont, CA (US); Jian Li, San Jose, CA (US)

(73) Assignee: Analog Devices International Unlimited Company, Limerick (IE)

( * ) Notice: Subject to any disclaimer, the term of this patent is extended or adjusted under 35 U.S.C. 154(b) by 462 days.

(21) Appl. No.: 17/319,790

(22) Filed: May 13, 2021

(65) Prior Publication Data

US 2021/0265908 A1  Aug. 26, 2021

Related U.S. Application Data

(63) Continuation of application No. 16/717,761, filed on Dec. 17, 2019, now Pat. No. 11,038,414.

(51) Int. Cl.
| | | |
|---|---|---|
| H02M 1/08 | (2006.01) |
| H02M 1/088 | (2006.01) |
| H02M 3/07 | (2006.01) |
| H02M 3/158 | (2006.01) |
| H02M 1/00 | (2006.01) |

(52) U.S. Cl.
CPC .............. *H02M 1/088* (2013.01); *H02M 3/07* (2013.01); *H02M 3/158* (2013.01); *H02M 1/0009* (2021.05)

(58) Field of Classification Search
CPC ........ H02M 1/088; H02M 3/07; H02M 3/158; H02M 1/0009; H02M 1/0048
See application file for complete search history.

(56) References Cited

U.S. PATENT DOCUMENTS

| | | | | |
|---|---|---|---|---|
| 5,939,871 | A * | 8/1999 | Tanaka | H02M 3/1563 |
| | | | | 323/290 |
| 9,203,302 | B2 | 12/2015 | Kelly | |
| 9,300,206 | B2 * | 3/2016 | Ye | H02M 1/4225 |
| 9,755,534 | B2 | 9/2017 | Mao | |
| 2003/0067278 | A1 | 4/2003 | Nakamura et al. | |

(Continued)

OTHER PUBLICATIONS

"U.S. Appl. No. 16/717,761, 312 Amendment filed Apr. 30, 2021", 6 pgs.

(Continued)

*Primary Examiner* — Jue Zhang
*Assistant Examiner* — Afework S Demisse
(74) *Attorney, Agent, or Firm* — Schwegman Lundberg & Woessner, P.A.

(57) ABSTRACT

Techniques for fine tuning efficiency of a power converter are provided. In an example, a method can include acquiring a plurality of samples of an electrical characteristic of the power converter over a range of switching frequencies of the power converter to provide a plurality of sample pairs, estimating a corner value of the electrical characteristic based on the plurality of samples pairs, estimating a corresponding frequency associated with the corner value of the electrical characteristic based on frequencies of the plurality of sample pairs, and setting a switching frequency of the power converter at the corresponding frequency.

13 Claims, 6 Drawing Sheets

(56) References Cited

U.S. PATENT DOCUMENTS

| | | | |
|---|---|---|---|
| 2008/0205103 A1* | 8/2008 | Sutardja | H02M 7/217 363/84 |
| 2014/0225439 A1* | 8/2014 | Mao | H02J 50/12 307/31 |
| 2017/0033696 A1 | 2/2017 | Handa et al. | |

OTHER PUBLICATIONS

"U.S. Appl. No. 16/717,761, Notice of Allowance mailed Feb. 3, 2021", 8 pgs.

* cited by examiner

SWITCHING POWER CONVERTER FREQUENCY OPTIMIZATION TECHNIQUES

CLAIM FOR PRIORITY

This is a continuation application which claims the benefit of priority to U.S. Non-Provisional application Ser. No. 16/717,761, filed Dec. 17, 2019, which is hereby incorporated by reference herein in its entirety.

TECHNICAL FIELD OF THE DISCLOSURE

The present disclosure is related to supply power for electronic devices and more particularly to techniques for tracking and selecting a switching frequency to operate a supply converter in an energy efficient manner.

BACKGROUND

Switching power converters are used to convert supply voltage or otherwise condition power for various electronic circuits and devices. Efficiency of a converter has been and will continue to be an important aspect for choosing one particular converter over another for use in a project. However, for mass produced power converters, designed efficiency may be underrated to account for expected variations in components of the converter, as such, converter efficiency can often be improved when the variations of a particular converter are taken into consideration.

SUMMARY OF THE DISCLOSURE

Techniques for automatically fine-tuning efficiency of a power converter are provided. In an example, a method can include acquiring a plurality of samples of an electrical characteristic of the power converter over a range of switching frequencies of the power converter to provide a plurality of sample pairs, estimating a corner value of the electrical characteristic based on the plurality of samples pairs, estimating a corresponding frequency associated with the corner value of the electrical characteristic based on frequencies of the plurality of sample pairs, and setting a switching frequency of the power converter at the corresponding frequency.

This section is intended to provide an overview of subject matter of the present patent application. It is not intended to provide an exclusive or exhaustive explanation of the invention. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

The present inventors have recognized techniques for optimizing efficiency of a switching power converter. A switching power converter can often be modeled as a voltage source followed by an output resistance over a variation of load current. Base on such a model, efficiency can depend on the value of output resistance. A smaller output resistance typically results in less voltage drop for given output current, therefore, less power loss and higher efficiency. The value of output resistance can be a variable of the supply switching frequency. As such, the inventors have recognized that optimum efficiency can be achieved when the selected switching frequency results in a minimum value of output resistance. In certain examples, the techniques of the present subject matter can track a parameter of the switching power converter over a range of switching frequencies, determine a particular slope trend of the parameter, and adjust the switching frequency of the switching power converter to the frequency where the slope trend indicates peak efficient operation. In some examples, the techniques can be employed to set a switching frequency of a power converter before the power converter is enabled to provide power to a system. In some examples, the techniques can be employed as a background task of a controller circuit of a switching power converter and can update the switching frequency as the switching power converter operates.

Figure 1:
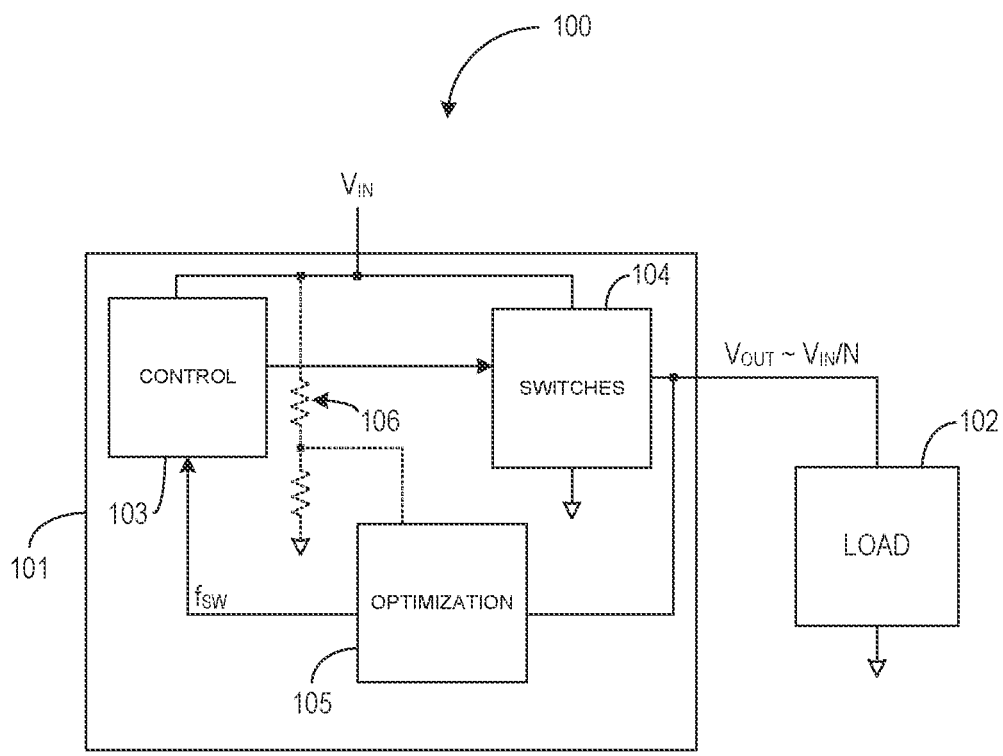
FIG. 1 illustrates generally an example system according to the present subject matter.

FIG. 1 illustrates generally an example system 100 according to the present subject matter. The system 100 can include an example switching power converter 101 or switching power supply and a load 102. The switching power converter 101 can include a switching controller 103, switch circuit 104, and an example optimization control circuit 105. The switching power converter 101 may or may not include the optimization control circuit 105. In the illustrated example, the power converter 101 is a buck-type, or step-down, converter and the output voltage ($V_{OUT}$) is designed to be fraction (1/N) of the input voltage ($V_{IN}$), where N is a number greater than 1. The present subject matter is not limited to step-down (buck) converters and can include step-up (boost) converters (e.g., $V_{OUT}=N \cdot V_{IN}$), switched-capacitor converters, pulse width modulated (PWM) converters, open-loop converters, closed-loop converters, constant duty cycle converters, or combinations thereof without departing from the scope of the present subject matter. In certain examples, the output voltage ($V_{OUT}$) of the power converter 101 can be sampled as the optimization control circuit 105 varies a switching frequency ($f_{SW}$) of the switching power converter 101. Over time, the optimization control circuit 105 can collect a number of sample pairs. Each sample pair can include the output voltage ($V_{OUR}$) of the switching power converter 101 and the switching frequency ($f_{SW}$) of the switching power converter 101 when the output voltage ($V_{OUT}$) was sampled. In some examples, the optimization control circuit 105 can include an optional voltage divider 106 coupled to the input voltage ($V_{IN}$), and instead of storing the output voltage ($V_{OUT}$) as part of each sampled pair, the optimization control circuit can include a voltage sample of the difference between the output voltage ($V_{OUT}$) and a scale representation of the input voltage (e.g., ($V_{IN}$/N)–$V_{OUT}$). The optimization circuit 105 can process the collected sample pairs and can detect a frequency associated with a peak output voltage or corner value of the output voltage. The frequency can be the switching frequency ($f_{SW}$) for operating the switching power converter 101 most efficiently for the given load and a given input voltage ($V_{IN}$).

Figure 2:
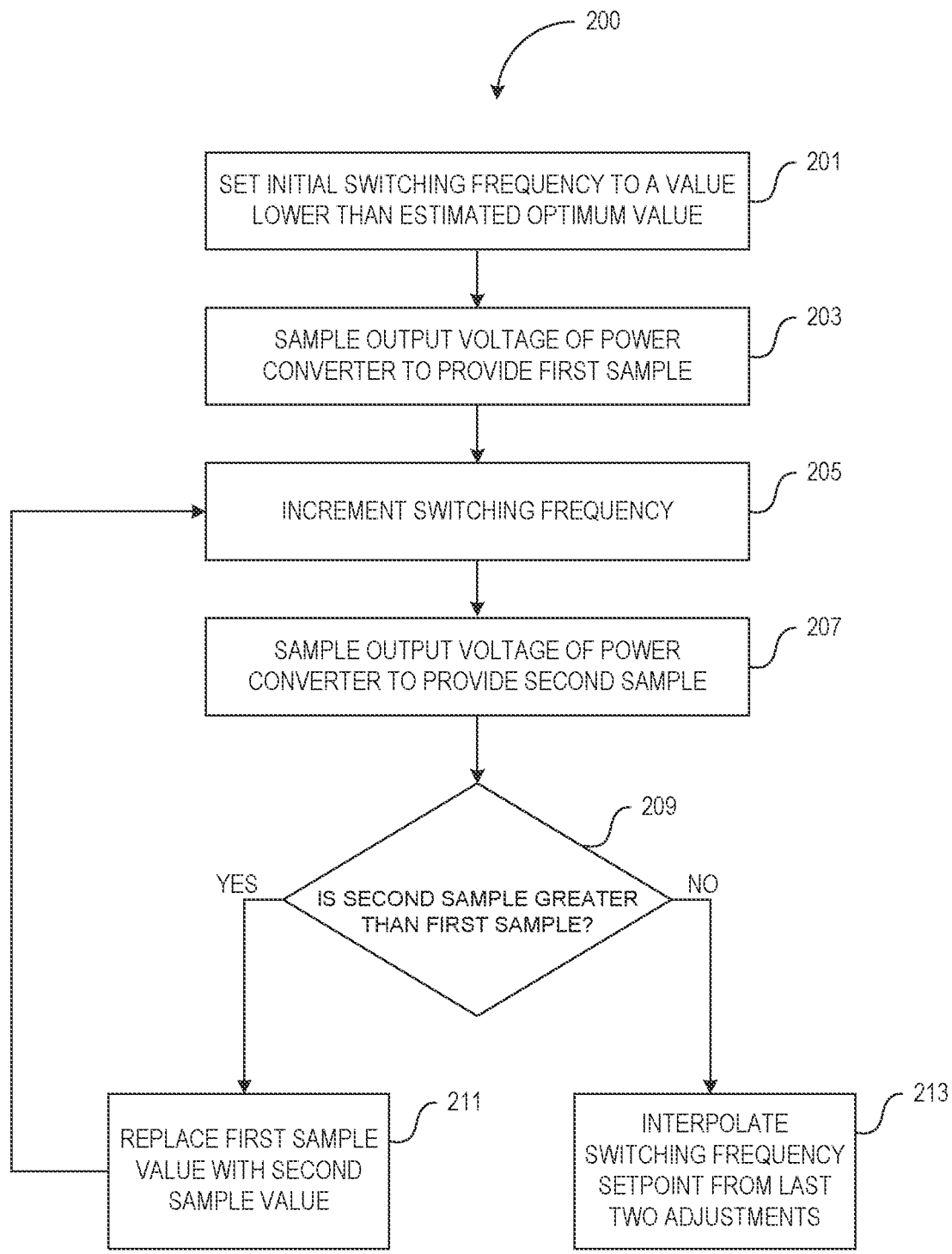
FIG. 2 illustrates generally a flowchart of an example method of monitoring and updating a switching frequency of a power converter.

FIG. 2 illustrates generally a flowchart of an example method 200 of monitoring and updating a switching frequency of a power converter with a non-regulated output voltage. The intent of the method is to operate the power converter at a switching frequency providing the most efficient operation of the power converter. At 201, the switching frequency can be set at a frequency lower than an anticipated optimum frequency. The anticipated optimum frequency can initially be estimated as the design frequency of the power converter. At 203, the output voltage of the switched power converter can be sampled to provide a first sample. At 205, the frequency can increment higher. At 207, the voltage can be sampled to provide a second sample, and the second sample can be compared with the first at 209. In response to the second sample being higher than the first sample, at 211, the first sample value can be replaced by the second sample value and the method can loop back to 205. In response to the second sample value not being greater than the first sample value, the second value can be estimated as a corner value of the output voltage and the switching frequency of the power converter can be set to one of the last two frequency settings. In some examples, at 213, the switching frequency of the switching power converter can be set to a value associated with an interpolated corner value derived from the output voltage associated with the last two switching frequency settings. It is understood that the method can also be executed by first setting the switching frequency to a frequency higher than the anticipated optimum frequency and incrementally lowering the switching frequency at 205 without departing from the scope of the present subject matter.

In some examples, the output voltage and frequency data pair samples can be collected during a first phase of a method and analysis of the collected data pairs can be executed during a second phase of the method. In such an example, slopes or trends of the collected data can be determined and evaluated to find the peak output voltage and the corresponding frequency. The switching frequency of the power converter can then be set to the corresponding frequency to provide efficient operation of the power converter. Although holding the input voltage and the supplied load current constant can improve the determination of the efficient switching frequency, holding such parameters can be difficult without additional circuitry or sacrificing user experience. As such, in certain examples, the sampled data can be collected over an extended time and can include multiple output voltage samples for each frequency. The sample pairs can then be determined by averaging the collected voltage samples at each frequency of interest. In some examples, the output voltages of the sample pairs can be maintained using on-going weighted averaging.

It is understood that the changing output voltage versus frequency is also an indirect measurement of the output resistance of the power converter with non-regulated output voltage. As such, in some examples, the representative voltage across the power converter circuit (e.g., (~($V_{IN}$/N)–$V_{OUT}$) can also provide an indirect measurement of the output resistance of the power converter. For power converters that step-up, or step-down the input voltage to provide the output voltage, one of either the input voltage or the output voltage can be scaled to provide a true representation of the voltage across the switching power converter. In the illustrated step-down power supply example of FIG. 1, the voltage value of the sample pairs can be ($V_{IN}$/N–$V_{OUT}$).

Figure 3:
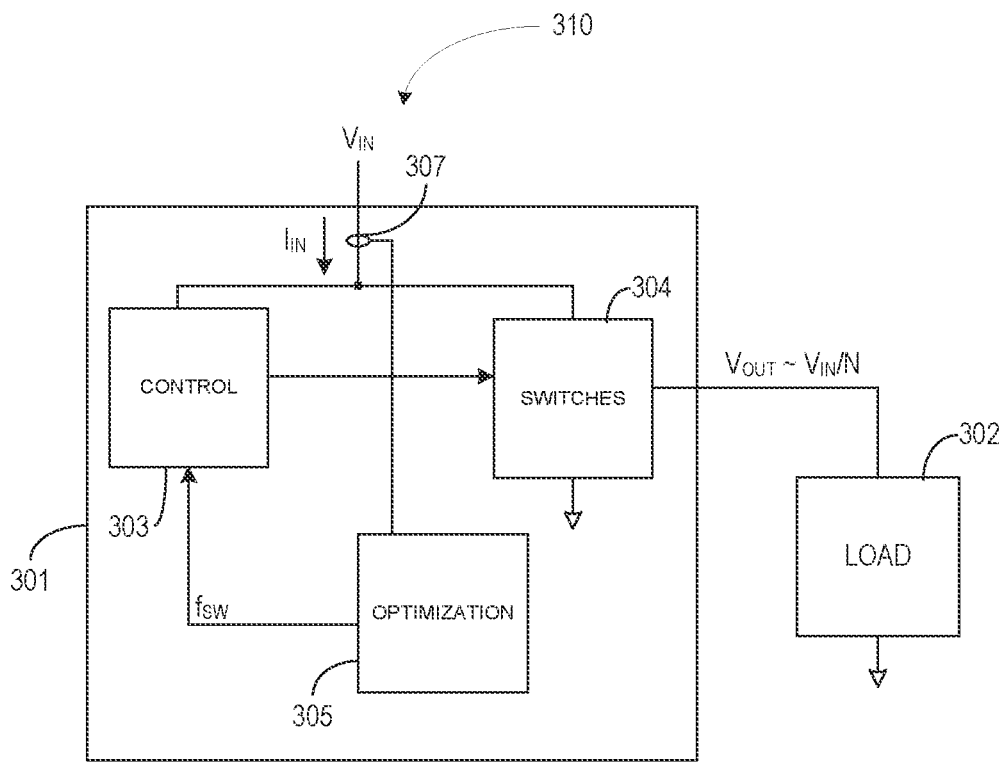
FIG. 3 illustrates generally an alternative, example system according to the present subject matter.

FIG. 3 illustrates generally an alternative, example system 310 according to the present subject matter. The system 310 can include a switching power converter 301 or switching power supply and an example optimization control circuit 305. The switching power converter 301 may or may not include the optimization control circuit 305. In the illustrated example, the power converter 301 is a step-down (buck) converter and the output voltage ($V_{OUT}$) is designed to be $V_{IN}$/N, where N is a number greater than 1. The present subject matter is not limited to a step-down converter. In some examples, such as step-up examples, the output voltage can be (N) times the input voltage. Whether a step-tip or a step-down example, the output voltage can be regulated or non-regulated. In certain examples, the input current ($I_{IN}$) of the power converter 301 can be sampled, via a current sensor 307, as the optimization control circuit 305 varies a switching frequency ($f_{SW}$) of the switching power converter 301. Over time, the optimization control circuit 305 can collect a number of sample pairs. Each sample pair can include the input current ($I_{IN}$) of the switching power converter 301 and the switching frequency ($f_{SW}$) of the switching power converter 301 when the input current ($I_{IN}$) was sampled. The optimization circuit 305 can process the collected sample pairs and can detect a frequency associated with a lowest input current level or corner value of the input current. The detected frequency is the switching frequency ($f_{SW}$) for operating the switching power converter 301 most efficiently for the given load and a given input voltage ($V_{IN}$).

Figure 4:
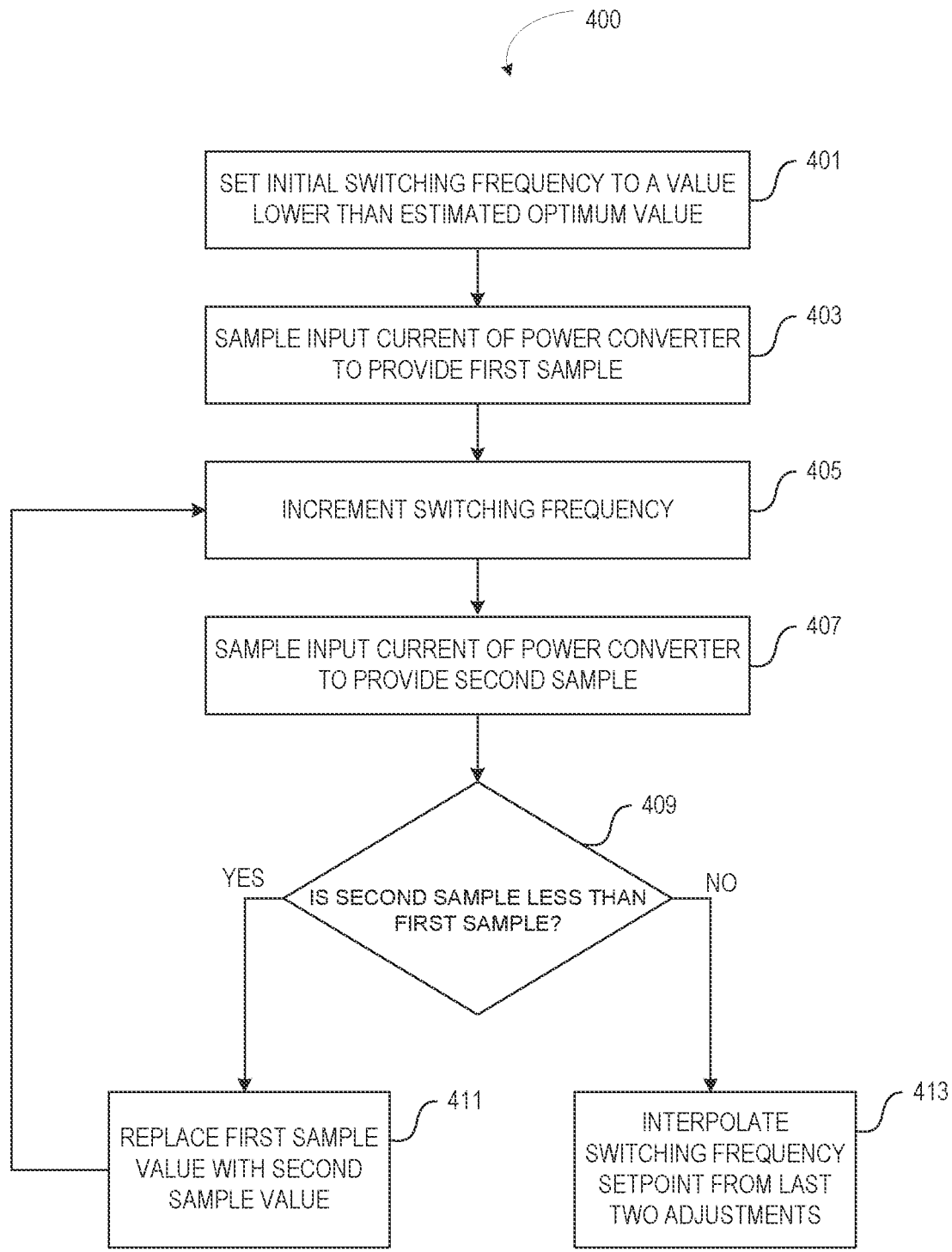
FIG. 4 illustrates generally a flowchart of an example method of monitoring and updating a switching frequency of a power converter.

FIG. 4 illustrates generally a flowchart of an example method of monitoring and updating a switching frequency of a power converter. The intent of the method is to operate the power converter at a switching frequency providing the most efficient operation of the power converter. For given output power and input voltage, an efficient point of operation of the power converter can be where the input supply current of the power converter is minimum. At 401, the switching frequency can be set at a frequency lower than an anticipated optimum frequency. The anticipated optimum frequency can initially be estimated as the design frequency of the power converter. At 403, the input current of the switched power converter can be sampled to provide a first sample. At 405, the frequency can increment higher. At 407, the input current can be sampled to provide a second sample, and the second sample can be compared with the first at 409. In response to the second sample being lower than the first sample, at 411, the first sample value can be replaced by the second sample value and the method can loop back to 405. In response to the second sample value not being lower than the first sample value, the second sample value can be estimated as a corner value of the input current and the switching frequency of the power converter can be set to the one of the last two frequency settings. In some examples, at 413, the switching frequency of the switching power converter can be set to a value associated with an interpolated corner value derived from the input current associated with the last two switching frequency settings. It is understood that the method can also be executed by first setting the switching frequency to a frequency higher than the anticipated optimum frequency and incrementally lowering the switching frequency at 405 without departing from the scope of the present subject matter.

In some examples, the input current and frequency data pair samples can be collected during a first phase of a method and analysis of the collected data pairs can be executed during a second phase of the method. In such an example, slopes of the collected data can be determined and evaluated to find the lowest input current and the corresponding frequency. The switching frequency of the power converter can then be set to the corresponding frequency to provide efficient operation of the power converter. Although holding the supplied load current constant can improve the determination of the efficient switching frequency, holding such parameters can be difficult without additional circuitry or sacrificing user experience. As such, in certain examples, the sampled data can be collected over an extended time and can include multiple input current samples for each frequency. The sample pairs can then be determined by averaging the collected input current samples at each frequency of interest. In some examples, the input currents of the sample pairs can be maintained using on-going weighted average.

Figure 5:
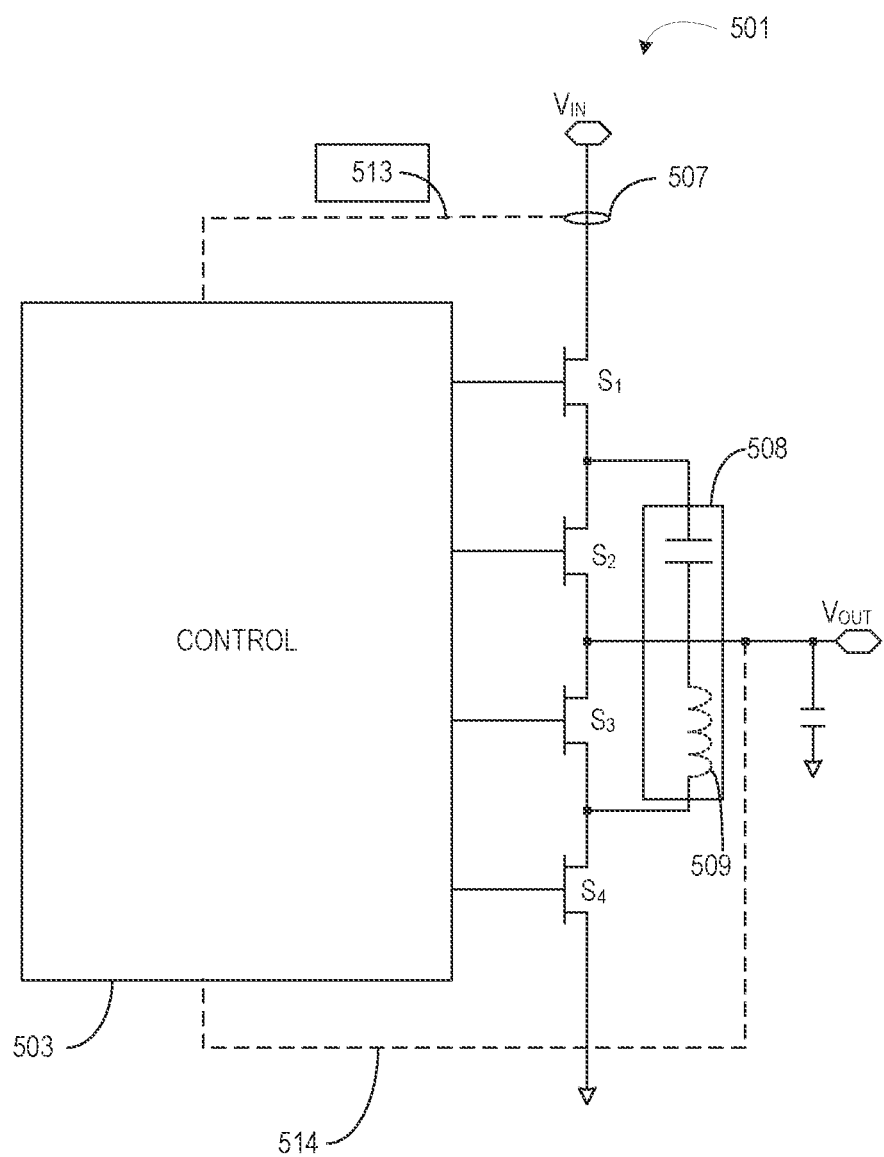
FIG. 5 illustrates generally an example power converter according to the present subject matter.

FIG. 5 illustrates generally an example power converter 501 according to the present subject matter. The power converter 501 can include a controller 503, a set of switches ($S_1$-$S_4$), and an energy storage circuit 508. In general, the power converter 501 uses the potential of the supply rails (e.g., $V_{IN}$, GND) to store energy in the energy storage circuit 508 and release the energy in a controlled manner to provide power to a load at a predetermined output voltage ($V_{OUT}$). Generally, but not all the time, the output voltage ($V_{OUT}$) is different than the voltage of the supply rails ($V_{IN}$). The controller 503 and the switches (S1-S4) control the flow of energy into and out of the energy storage circuit 508. The illustrated power converter 501 is a switched-capacitor power converter that primarily relies on the charge storage capability of a capacitor of the energy storage circuit 508 to assist in converting power. In certain examples, the energy storage circuit 508 can optionally include an inductor 509 to form a resonant switched-capacitor power converter. It is understood that in addition to switched-capacitor power converters, other switched power converter architectures can be used in combination with the techniques discussed in regard to FIGS. 1-4 without departing from the scope of the present subject matter. Such switched power converters can include, but are not limited to, pulse-width modulation (PWM) converters, resonant converters, etc. It is understood, as discussed with reference to FIG. 1, that the controller 503 can include a optimization circuit that can sample either the input current 513, via an optional current sensor 507, or the output voltage 514, over a range of switching frequencies and can determine a switching frequency that allows the power converter 501 to operate most efficiently for a given load and a given input voltage.

Figure 6A:
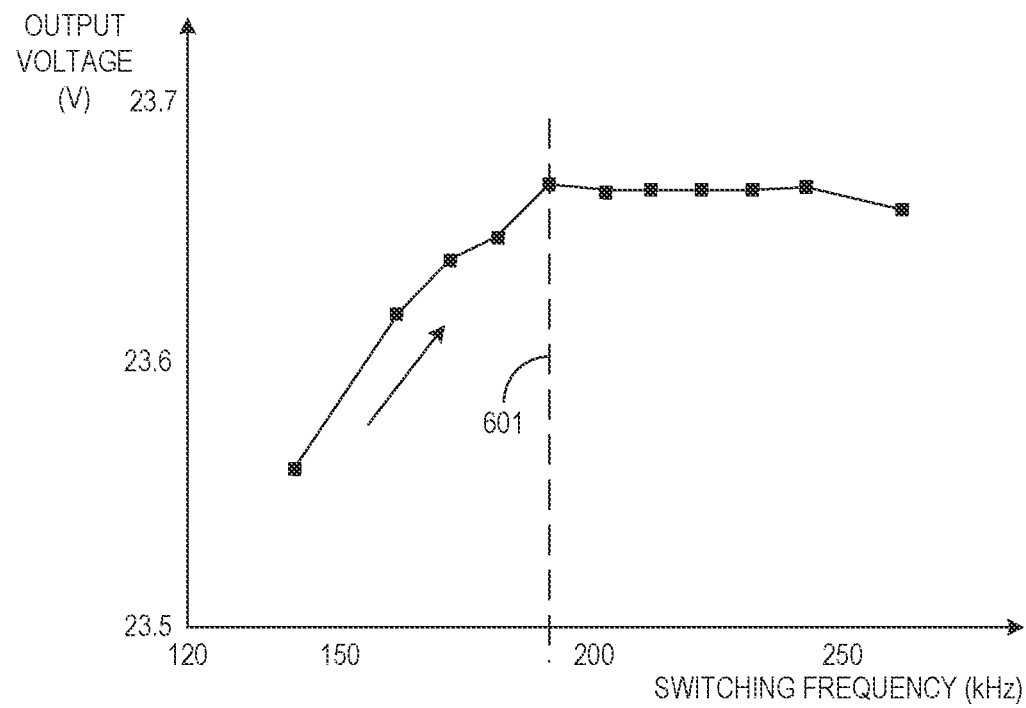
FIGS. 6A and 6B illustrate graphically example data pairs that can be collected and used to identify a more optimal switching frequency of a switching power converter compared to, for example, the designed switching frequency.
Figure 6B:
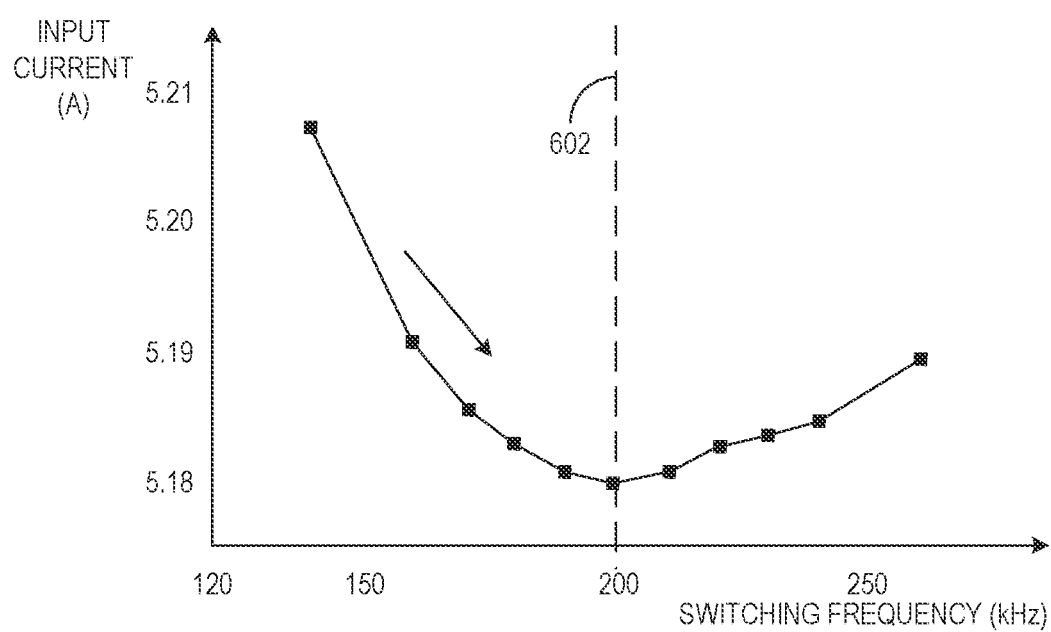

FIGS. 6A and 6B illustrate graphically example data pairs (■) that can be collected and used to identify a more optimal switching frequency of a switching power converter compared to, for example, the designed switching frequency. The example data is for a power converter receiving a supply voltage of 48 volts and rated for providing 240 watts of power. FIG. 6A illustrates graphically the method of FIG. 2 and includes a plot of data pairs including an output voltage and corresponding frequency as the frequency is increased from an initial frequency located below the estimated optimal frequency. The illustrated data was collected from a demo board for a Linear Technologies/Analog Devices LTC7820 high-power, inductorless, DC-to-DC power converter configured to receive a 48-volt supply rail and to provide 240 Watts of output power at 24 volts. The illustrated example shows that the data pairs are collected as the switching frequency is increased. In some examples, the method of determining a more optimal switching frequency can start from a frequency anticipated to be higher than the optimal switching frequency and collecting data-pairs as the frequency is decreased.

In some examples, an initial switching frequency can be set and the power converter can provide the intended function to supply an output voltage to a load. As the power converter is operating the switching frequency can be adjusted about where an optimal switching frequency is anticipated to exist. The switching frequency adjustments can be random or can be made according to a predetermined sequence. Between each adjustment, the output voltage can be sampled one or more times. After the sequence of switching frequency adjustments is complete, the collected data can be analyzed. In certain examples, if there is more than one output voltage sample associated with a given switching frequency, a data-pair can be constructed by averaging the collected samples for the given switching frequency.

Once the data pairs are constructed, each successive output voltage of a data-pair can be compared to the next output voltage of the next data-pair as the frequency is incremented to identify the next data pair. Where the comparison of the data-pairs indicates a peak in the output voltage across the range of switching frequencies of the set of data pairs, the optimization circuit can identify an optimal switching frequency 601 that allows the switching power converter to operate most efficiently. In some examples, a slope can be determined for each neighboring data-pair and where the slope goes to zero or changes polarity can be used to identify the optimal switching frequency. In some examples, and as illustrated with the right axis of the plot of FIG. 6, instead of using a representation of only the output voltage, the method can use a difference between a scaled representation of the input voltage and the representation of the output voltage to assist in determining an optimal switching frequency.

FIG. 6B illustrates graphically the method of FIG. 4 and includes a plot of data pairs including an input current of the power converter and a corresponding switching frequency of the power converter as the switching frequency is increased from an initial frequency located below an estimated optimal frequency. The illustrated data was collected from a demo board for a Linear Technologies/Analog Devices LTC7820 high-power, inductorless, DC-to-DC power converter configured to receive a 48-volt supply rail and to provide 240 Watts of output power at 24 volts. The illustrated example shows that the data pairs are collected as the switching frequency is increased. In some examples, the method of determining a more optimal switching frequency can start from a frequency anticipated to be higher than the optimal switching frequency and collecting data-pairs as the frequency is decreased.

In some examples, an initial switching frequency can be set and the power converter can provide the intended function of supplying an output voltage to a load. As the power converter is operating, the switching frequency can be adjusted about where an optimal switching frequency is anticipated to exist. The switching frequency adjustments can be random or can be made according to a predetermined sequence. Between each adjustment, a current sensor can be sampled one or more times to provide a representation of the input current of the power converter. After the sequence of switching frequency adjustments is complete, the collected data can be analyzed. In certain examples, if there is more than one input current sample associated with a given switching frequency, a data-pair can be constructed by averaging the collected sample values for the given switching frequency.

Once the data pairs are constructed, each input current sample of a data-pair can be compared to the input current sample of the next successive data-pair as the frequency is incremented to identify the next data-pair. Where the comparison of the data-pairs indicates a valley in the frequency successive trend of the input current across the range of switching frequencies of the set of data pairs, the optimization circuit can identify an optimal switching frequency 602 that allows the switching power converter to operate most efficiently. In some examples, a slope can be determined for each neighboring data-pair. Where the slope goes to zero or changes polarity, the associated frequency can be used as the optimal switching frequency of the power converter.

VARIOUS NOTES & EXAMPLES

IN a first example, Example 1, a method for optimizing a switching frequency of a power converter can include acquiring a plurality of samples of an electrical characteristic of the power converter over a range of switching frequencies of the power converter to provide a plurality of sample pairs, each sample pair including a measure of the electrical characteristic and a corresponding frequency, estimating a corner value of the electrical characteristic based on the plurality of samples pairs, estimating a corresponding frequency associated with the corner value of the electrical characteristic based on frequencies of the plurality of sample pairs, and setting a switching frequency of the power converter at the corresponding frequency.

In Example 2, the electrical characteristic of Example 1 optionally is an output voltage of the power converter.

In Example 3, the acquiring a plurality of samples of an electrical characteristic and estimating the corner value of any one or more of Examples 1-2 optionally includes measuring a first sample of the output voltage at a first switching frequency of the power converter to provide a first voltage/frequency pair of the plurality of samples pairs, measuring a second sample of the output voltage at a second switching frequency of the power converter to provide a second voltage/frequency pair of the plurality of sample pairs, the second switching frequency higher than the first switching frequency, and comparing the first sample with the second sample to provide a first comparison.

In Example 4, the estimating the corner value and the estimating the corresponding frequency of any one or more of Examples 1-3 optionally includes interpolating the corresponding frequency from the first switching frequency and the second switching frequency in response to the first comparison indicating the second sample is less than the first sample.

In Example 5, the estimating the corner value and the estimating the corresponding frequency of any one or more of Examples 1-3 optionally includes acquiring a third sample of the output voltage at a third switching frequency of the power converter in response to the first comparison indicating the second sample is greater than the first sample, wherein the third switching frequency is greater than the second switching frequency.

In Example 6, the power converter of any one or more of Examples 1-5 optionally is a switched capacitor power converter.

In Example 7, the electrical characteristic of any one or more of Examples 1-6 optionally is input current of the power converter.

In Example 8, the acquiring a plurality of samples of an electrical characteristic and estimating a corner value of any one or more of Examples 1-7 optionally includes measuring a first sample of the input current at a first switching frequency of the power converter to provide a first current/frequency pair of the plurality of samples pairs, measuring a second sample of the input current at a second switching frequency of the power converter to provide a second current/frequency pair of the plurality of sample pairs, the second switching frequency higher than the first switching frequency, and comparing the first sample with the second sample to provide a first comparison.

In Example 9, the estimating the corner value and the estimating the corresponding frequency of any one or more of Examples 1-8 optionally includes interpolating the corresponding frequency from the first switching frequency and the second switching frequency in response to the first comparison indicating the second sample is less than the first sample.

In Example 10, the estimating the corner value and the estimating the corresponding frequency of any one or more of Examples 1-9 optionally includes acquiring a third sample of the input current at a third switching frequency of the power converter in response to the first comparison indicating the second sample is greater than the first sample, wherein the third switching frequency is greater than the second switching frequency.

In Example 11, a power converter can include an energy storage circuit, a plurality of switches configured to regulate power into and out of the energy storage circuit, a controller configured to switch the plurality of switches based on a switching frequency to convert an input voltage to an output voltage, and an optimization circuit. The optimization circuit can be configured to acquire a plurality of samples of an electrical characteristic of the power converter circuit over a range of switching frequencies of the power converter to provide a plurality of sample pairs, each sample pair including a measure of the electrical characteristic and a corresponding frequency, estimate a corner value of the electrical characteristic based on the plurality of samples pairs, estimate a corresponding frequency associated with the corner value of the electrical characteristic based on frequencies of the plurality of sample pairs, and set a switching frequency of the power converter at the corresponding frequency.

In Example 12, the electrical characteristic of any one or more of Examples 1-11 optionally is the output voltage.

In example 13, the electrical characteristic of any one or more of Examples 1-12 optionally is an input current of the power converter.

In Example 14, the power converter of any one or more of Examples 1-13 optionally includes a current sensor configured to sense the input current of the power converter.

In Example 15, the optimization circuit of any one or more of Examples 1-14 optionally is configured to determine a slope for each adjacent sample pair of the plurality of sample pairs and to identify the corner value when a polarity of two adjacent slopes changes.

In Example 16, the optimization circuit of any one or more of Examples 1-15 optionally is configured to interpolate the corresponding frequency from frequency values of the sample pairs associated with the two adjacent slopes.

In Example 17, the energy storage circuit of any one or more of Examples 1-16 optionally includes a capacitor.

In Example 18, a machine-readable medium, comprising instructions, which when executed by a processor of a power converter, can cause the processor to perform operations including acquiring a plurality of samples of an electrical characteristic of the power converter over a range of switching frequencies of the power converter to provide a plurality of sample pairs, each sample pair including a measure of the electrical characteristic and a corresponding frequency, estimating a corner value of the electrical characteristic based on the plurality of samples pairs, estimating a corresponding frequency associated with the corner value of the electrical characteristic based on frequencies of the plurality of sample pairs, and setting a switching frequency of the power converter at the corresponding frequency.

In Example 19, the electrical characteristic of any one or more of Examples 1-18 optionally is an input current of the power converter.

In Example 20, the electrical characteristic of any one or more of Examples 1-19 optionally is an output voltage of the power converter.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, the terms "including" and "comprising" are open-ended, that is, a system, device, article, composition, formulation, or process that includes elements in addition to those listed after such a term are still deemed to fall within the scope of subject matter discussed. Moreover, such as may appear in a claim, the terms "first," "second," and "third," etc. are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to allow the reader to quickly ascertain the nature of the technical disclosure. It is submitted with the understanding that it will not be used to interpret or limit the scope or meaning of a claim. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. The following aspects are hereby incorporated into the Detailed Description as examples or embodiments, with each aspect standing on its own as a separate embodiment, and it is contemplated that such embodiments can be combined with each other in various combinations or permutations.

What is claimed is:

1. A method for operating a switching power converter, the method comprising:
    operating the power converter at multiple different switching frequencies;
    measuring an input current of the power converter at each of the multiple different switching frequencies, including receiving information about the input current at a first switching frequency to provide a first current/frequency pair, and receiving information about the input current at a second switching frequency to provide a second current/frequency pair; and
    establishing an operating switching frequency of the power converter based on a comparison result of the first and second current/frequency pairs.

2. The method of claim 1, further comprising operating the power converter using the operating switching frequency as-established.

3. The method of claim 1, wherein establishing the operating switching frequency of the power converter includes determining a switching frequency associated with a corner value of the measured input currents.

4. The method of claim 1, comprising measuring an output voltage of the power converter at each of the multiple different switching frequencies.

5. The method of claim 4, wherein measuring the output voltage of the power converter includes:
    receiving information about the output voltage at a first switching frequency to provide a first voltage/frequency pair; and
    receiving information about the output voltage at a second switching frequency to provide a second voltage/frequency pair;
    wherein establishing the operating switching frequency of the power converter is based on a comparison result of the first and second voltage/frequency pairs.

6. A non-transitory machine-readable medium comprising instructions that, when executed by a processor of a power converter controller, cause the processor to perform operations comprising:
providing a control signal to a power converter at multiple different switching frequencies;
measuring an input current of the power converter at each of the multiple different switching frequencies, including receiving information about the input current at a first switching frequency to provide a first current/frequency pair, and receiving information about the input current at a second switching frequency to provide a second current/frequency pair; and
updating the control signal to establish an operating switching frequency of the power converter, wherein the operating switching frequency is based on a comparison result of the first and second current/frequency pairs.

7. The non-transitory machine-readable medium of claim 6, wherein the instructions for updating the control signal to establish the operating switching frequency include instructions for determining a switching frequency associated with a corner value of the measured input currents.

8. The non-transitory machine-readable medium of claim 6, comprising instructions for measuring an output voltage of the power converter at each of the multiple different switching frequencies.

9. The non-transitory machine-readable medium of claim 8, wherein the instructions for measuring the output voltage of the power converter include instructions for the processor to perform operations comprising:
receiving information about the output voltage at a first switching frequency to provide a first voltage/frequency pair; and
receiving information about the output voltage at a second switching frequency to provide a second voltage/frequency pair;
wherein the instructions for updating the control signal to establish the operating switching frequency of the power converter include instructions for comparing the first and second voltage/frequency pairs and selecting the operating switching frequency based on a result of the comparison.

10. A system comprising:
an energy storage circuit;
switches configured to regulate energy provided to and released from the energy storage circuit; and
a controller configured to provide respective control signals to control operation of the switches and thereby control conversion of an input signal to an output signal, the control signals having an adjustable switching frequency;
wherein the controller is configured to measure an electrical characteristic of the output signal at each of multiple different switching frequencies and, based on a corner value of the measured electrical characteristics for the multiple different switching frequencies, establish an optimized operating switching frequency for the system, wherein the controller is configured to determine the corner value using multiple sample pairs of the measured electrical characteristics and corresponding different switching frequencies, and using information about a slope between adjacent sample pairs.

11. The system of claim 10, wherein the controller is configured to measure an output voltage of the output signal at each of the multiple different switching frequencies and, based on a relationship between the measured output voltages and the corresponding different frequencies, establish the optimized operating switching frequency.

12. The system of claim 10, wherein the controller is configured to measure an input current of the input signal at each of the multiple different switching frequencies and, based on a relationship between the measured input currents and the corresponding different frequencies, establish the optimized operating switching frequency.

13. The system of claim 12, further comprising a current sensor configured to provide information about a magnitude of the input current to the controller.

* * * * *